INVENTORS
Emile Plumat &
Lucien Leger

United States Patent Office 3,512,869
Patented May 19, 1970

3,512,869
MATERIALS AND ARTICLES HAVING LIGHT-TRANSMISSION PROPERTIES WHICH VARY AS A FUNCTION OF INCIDENT RADIATION
Emile Plumat, Gilly, and Lucien Leger, Montigny le Tilleul, Belgium, assignors to Glaverbel S.A., Brussels, Belgium
Filed Oct. 20, 1966, Ser. No. 588,058
Claims priority, application Luxembourg, Oct. 27, 1965, 49,724
Int. Cl. G02f 1/00
U.S. Cl. 350—160
21 Claims

ABSTRACT OF THE DISCLOSURE

Materials and articles arranged to transmit light and including at least one normally transparent layer carried on a support sheet made of a light-transmitting material and containing a first substance which reversibly dissociates under the influence of solar radiation for producing a plurality of dissociation products one of which acts to reduce the transparency of the layer and a second substance which acts as an acceptor for another one of the dissociation products only as long as the incident radiation level is maintained.

---

The present invention relates to the control of light transmission, and particularly to materials and articles having variable light-transmission properties.

In recent years there has been a considerable increase in the amount of glasswork incorporated into buildings. Although the provision of a large amount of glass is generally beneficial since it permits the interior of a building to receive a large amount of natural light, it also presents several inconveniences since large glass areas produce excessive glare and heat transmission. Various attempts have already been made to develop materials which minimize these inconveniences, but there is still a great need for improvements in this field. For example, it has already been suggested to solve these problems by means of sheet glass having a special composition containing dispersed crystallites which cause the glass to darken under the influence of incident radiation. Although such glass does produce satisfactory results, it could only be used in rare situations primarily because it is very expensive to fabricate.

It is therefore an object of the present invention to provide improved glasswork for buildings.

Another object of the present invention is to provide glasswork having improved glare reducing properties.

A further object of the present invention is to provide glasswork having improved heat reflection and absorption properties.

Still another object of the present invention is to provide inexpensive glasswork having variable light-transmission properties.

These and other objects according to the present invention are achieved by the provision of a light-transmitting article composed of a support means of light-transmitting material, and at least one normally transparent layer carried by the support. The at least one layer contains a first substance which reversibly dissociates under the influence of solar radiation for producing a plurality of dissociation products at least one of which acts to reduce the transparency of the layer with respect to at least a part of such radiation, and a second substance for accepting at least one of the other products of such dissociation as long as the conditions causing such dissociation exist.

Since the present invention is primarily intended for use in the manufacture of glasswork, the support means will normally be constituted by sheet glass. However, it should be appreciated that the support means can be made of other materials and in other forms for achieving the advantageous results of the present invention. Thus, the support means can be made of a plastic, such as an acrylic plastic, of Celluloid, or of cellophane, or they can be constituted by lenses for use in eyeglasses or the like.

Moreover, while the support means will, in most cases, have a high degree of transparency to visible light, the present invention can also be employed in conjunction with support means having a noticeable, but not extremely high, transparency or translucency. Furthermore, while the support means may be made of a permanently tinted material, it is preferred that it be colorless, or substantially so. When sheet glass is used as the support means, this glass may have a composite or laminar structure, of the type exemplified by Triplex glass.

Additional objects and advantages of the present invention will become apparent upon consideration of the following description when taken in conjunction with the accompanying drawings in which.

Figure 1:
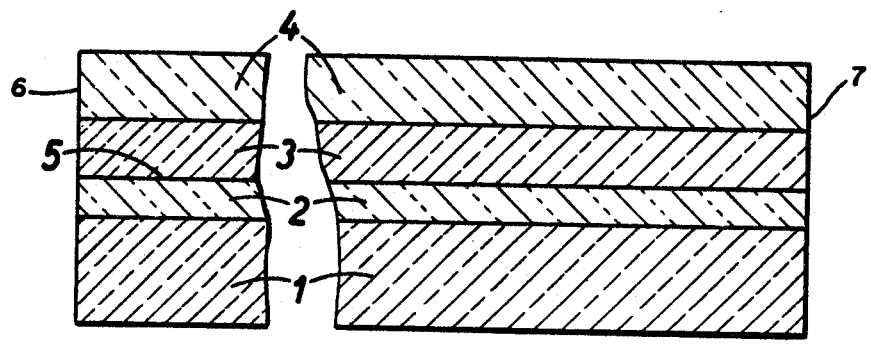
FIG. 1 is a cross-sectional view illustrating a first embodiment of the present invention.

Referring first to the embodiment of FIG. 1, it includes a support means constituted by a transparent sheet 1 of plate or conventional soda-lime glass. The sheet 1 of FIG. 1 may, for example, be one meter square and have a thickness of the order of 5 millimeters. This sheet is covered with a transparent layer 2 which is light-sensitive, and which is made of, or includes, a substance which reversibly dissociates under the influence of solar radiation for reducing the transparency of layer 2 with respect to at least a portion of the radiation spectrum. Layer 2 is covered with a layer 3 containing a substance which acts as an acceptor for accepting at least one of the products of such dissociation as long as the conditions causing the dissociation exist. A boundary layer 5 separates layers 2 and 3. Finally, the arrangement is covered with an impermeable protective layer 4 whose presence is optional in some cases.

The layer 2 is either made of, or contains, a substance which dissociates, i.e., breaks up into simpler constituents, or dissociation products, under the influence of solar radiation or a specific solar radiation wavelength band. The substance is selected to be of a type such that the transparency of the layer 2 itself decreases when such dissociation product or products are formed. In addition, the dissociation product or products themselves, may, in certain cases, contribute toward the decrease in transparency. The acceptor substance, which may be constituted by, or disposed in, the layer 3, or which may be disposed in the same layer as the light-sensitive substance, is made of a material which is capable of accepting at least one of the dissociation products whenever such dissociation occurs.

According to one important advantage of the present invention, the composition of the support does not have to be selected so that the support itself provides the light-responsive function affecting the light-transmittance of the material or article. This function is relegated to a coating layer so that the composition of the support itself can be chosen entirely with regard to other desirable properties. This support may, for example, be a sheet of glass of ordinary and inexpensive composition. This represents a distinct improvement over a previously suggested approach which involved the manufacture of glass of special composition including dispersed crystallites which cause reversible darkening of the glass under the action of incident radiation, it being appreciated that this would be very expensive compared with the solution offered by the present invention.

The layer containing the dissociating compound, or substance, should, of course, cover the whole of the support means, or at least the whole of the area through which light is to be transmitted and modified in dependence on the intensity of the incident light. If the layer comprising the dissociating compound or compounds contains an ingredient or ingredients other than such compound(s), the latter should at least be present in a high proportion so that when dissociation occurs a substantially continuous barrier or screen is formed across the path of the incident light. The support means may, of course, be provided with more than one layer of a dissociating compound or compounds. For example, one such layer may be provided on each side of the support. The layer or layers need not be applied directly to the support, but may be separated from the support by an intervening or underlying layer. Such an intervening layer may, if desired be a layer of, or containing a substance or substances serving as an acceptor for one of the dissociation products.

The dissociating compound or compounds should be selected in dependence on the wavelengths of the light to which it is desired to have such compound(s) respond and on the effect on the light-transmittance which is to be achieved by the dissociation. Compounds which can be used include photolyzable and photosensitive substances which dissociate when sufficiently irradiated by radiation lying in the nonvisible or the visible portions of the solar radiation spectrum.

In general, the selected dissociating compound or compounds should be capable of being dissociated by light in at least part of the wavelength range of from 0.25 to 1 micron. Depending on the nature of the selected dissociating compound or compounds, one or more dissociation products may produce a selective absorption of light of certain wavelengths, or a more or less uniform reduction in the transmittance of light over the visible range and the neighboring parts of the infrared and ultraviolet bands, by an amount which varies with the intensity of the incident radiation. It will usually be desirable for the light-transmittance to be reduced substantially uniformly over the visible part of the light spectrum so as to prevent any apparent change in the color of the transmitted light.

The dissociating compound or compounds can, if desired, be selected so that the dissociation occurs at a comparatively low incident light energy level so that, for example, the material or article has a reduced transparency to light under "normal" light conditions and an increased transparency to light when the prevailing light conditions are poor. However, in most cases it will be desirable for the transparency to light to decrease as the prevailing light intensity rises above normal.

The method by which the layer or layers of the dissociating compound or compounds, or any other coating layer, are applied to the support must be such as not to impair the mechanical, thermal or chemical properties of the support. For example, if the support is of a plastic material, the method by which such layer is deposited will be one that does not require the sheet to be raised to an excessively high temperature. On the other hand, it is apparent that in the manufacture of an article according to the invention comprising more than one sheet or other member able to function as a support for the layer, and wherein one such member is more liable to damage than the other member or members, the layer may be applied to the most durable member.

Preferred embodiments of the present invention employ a photosensitive halide or halides as the dissociating compound or compounds. As will hereafter be exemplified. It is possible, by using photosensitive halides, to provide materials and articles which exhibit very rapid response to changes in the intensity of incident sunlight.

In tests performed on sheet materials according to the invention, which incorporates a layer of photosensitive silver halides as the dissociating compounds and a superposed transparent layer of an acceptor substance for accepting the halogen component liberated by irradiation, no fatigue effect, i.e., deterioration in performance, was observed even after several tens of thousands of cycles of exposure to alternating sunshine and overcast conditions.

Preferred photosensitive halides are the chlorides, bromides and iodides of silver, mercury and thallium, used singly or in combinations of two or more. Although other halides, lead halide for instance, can be used, the above-mentioned preferred halides are particularly active at ordinary temperature while possessing a high degree of lattice stability. Such halides dissociate when sufficiently irradiated by light having a wavelength of between 300 and 500 m$\mu$ (millimicrons). However, since each of the halides has a specific sensitivity curve which is slightly different from the others, the manner in which the light-transmittance is modified in response to variations of the intensity of the incident radiation can be adjusted to suit specific requirements by an appropriate selection of the halide or halides incorporated in the photosensitive layer.

Although the precise mechanism of the action of the radiation on these reversibly dissociable substances is still unknown, it has been ascertained that radiation having a wavelength of between about 300 and 500 m$\mu$, i.e., forming part of a near-ultraviolet spectral band and/or a band of the visible spectrum which includes violet, blue and green, dissociates a photosensitive halide molecule into a residue of subhalogenated metal and a halogen element, which latter element migrates in the direction of the superposed transparent layer containing an acceptor compound which can store the halogen.

The halogen, in its ionic, atomic, or molecular form, is captured and stored by the superposed layer for as long as the incident radiation is sufficiently intense to maintain the dissociation, while the subhalogenated metal residue renders the photosensitive layer more or less gray and thus more or less reduces its transparency not only to ultraviolet, but also to other radiation of the visible and infrared zones of the spectrum. The transparency continues to decrease as the intensity of the incident radiation increases.

It is known that at certain times of the day an increase in the intensity of the radiation received from the sun is accompanied by an increase in the proportion of ultraviolet radiation. The greater the increase in the incident ultraviolet radiation, the greater will be the accompanying reduction in the transparency of the sheet material, not only to ultraviolet radiation but also to visible and infrared rays. In consequence, there will be no apparent change in the color of the transmitted radiation.

When the intensity of the incident radiation decreases, the halogen element leaves the acceptor-containing layer and recombines with the residue of metal or subhalogenated metal, thus reconstituting the original halide.

Although it is possible to directly form the photosensitive halide layer in a single operation, such layer is preferably formed by the deposition of a metal followed by the halogenation thereof in situ. Thus, a preferred procedure may be carried out by first depositing a thin transparent layer of a metal or metals, for instance silver and/or thallium, on the filass sheet or other support by immersing the support in a chemical bath or by vaporization of the metal(s) in vacuo, for example. Then the thin metal layer is converted into a halide, or a mixed halide, in a dark chamber, for instance by circulating in the chamber a current of gas containing one or more of the following gases: chlorine, bromine, and iodine. The reaction temperature is relatively low and is hardly higher than ambient temperature.

The metal layer is thus converted into a layer of microcrystals of a single halide, or a combination of different halides of one or more metals, which halides may be chosen with regard to their differing capacities for absorbing radiation in different parts of the solar radiation spectrum.

The photosensitive layer must be kept under darkroom conditions until after it has been covered with the layer which stores the halogen component liberated under the action of incident light. The latter layer also serves to protect the silver halide layer against mechanical damage. If desired, however, the acceptor-containing layer can itself be coated with one or more layers or sheets for protective purposes and/or for purposes of imparting particular optical properties to the light-transmitting material as a whole. Such a further layer or sheet may, if desired, be tinted.

It is desirable for the halide(s) used to be continuously and uniformly distributed over the support means so that all parts of the photosensitive layer will be equally rich in active light-sensitive material. This result is easily achieved by forming a halide layer in situ as described above. In addition, this permits layers to be produced in which the metal and halogen components of the halide are combined in proportions which are not strictly stoichiometric. This increases the rapidity of the response to excitation because of the resulting presence of unoccupied sites in the crystal lattices, which sites, in general, facilitate the exchange of ions, electrons or atoms within these lattices.

Instead of applying the photosensitive halide layer directly to the surface of the sheet or other support, another coating layer may, as previously stated, be applied first. This first coating layer may, for example, be an underlying or attaching layer of a composition based on an oxide or silane. The presence of such an attaching layer, which may partially enclose the subsequently deposited halide crystals, does not interfere with the mechanism of radiation responsive dissociation and recombination.

It is preferable for the halogen component liberated in the photosensitive layer to be releasably held by adsorption at a boundary surface between the halide layer and a neighboring layer, and it is for this reason that the acceptor substance is preferably present in a coating layer adjacent the halide layer. As previously stated, in the preferred embodiments of the present invention the acceptor is present in a light-transmitting layer applied on top of the halide layer. The provision of an adsorbent layer is advantageous because it permits a substantially instantaneous response to variations in the incident radiation flux density.

Various substances can be used as the halogen acceptor, e.g., oxides of silicon, titanium, tin, or aluminum, or a mixture of two or more such oxides. Layers of these oxides are completely transparent if they are thin, although they can be given a thickness exceeding several thousand Angstrom units. Such oxide layers will adhere satisfactorily to photosensitive halide layers of the type hereinbefore described. Those oxide layers reversibly adsorb halogen given off from the photosensitive halide, probably in a gaseous atomic or molecular state. The oxides can be diluted by other chemical substances, such as silanes, provided that such other substances do not impart such a high degree of porosity to the layer that the liberated halogen can escape. Another substance which can be used as a halogen acceptor is carbon, which may be made to form a very thin layer or film.

The user of a layer of an appropriate acceptor adjacent the halide layer enables the gaseous halogen to be fixed at the boundary surface between the acceptor layer and the halide layer without becoming diffused or migrating into the acceptor layer. This is particularly advantageous since it substantially prevents any loss of halogen even over a very long period of use and therefore prevents "fatigue" or deterioration of the system while permitting it to exhibit a nearly instantaneous response.

The acceptor substances can be formed in situ by various techniques depending on the substance or substances to be employed in a given case. Thus, certain of the substances can be formed in situ from the corresponding chlorides or other halide, or from an organo-metallic hydrolyzable salt, which may be applied in solution, possibly as a vapor, to the underlying layer. The acceptor may, in appropriate cases, also be applied by evaporation in vacuo.

The acceptor layer may, as already indicated, be covered by another layer. If, for example, the acceptor layer is more or less porous, it would be desirable to cover it by an impermeable light-transmitting layer, which latter may, if desired, be light-dispersing, in order to avoid loss of the active dissociation product which is to be temporarily held by the acceptor layer. Such a cover layer may be a layer of, or containing, a pyrogenated metal or metalloid oxide, e.g., MgO, ZnO, $ZrO_2$ or a colored oxide of iron, nickel or chromium. The cover layer may, for example, be produced by applying to the already coated sheet or other support means a suspension of a salt of other compound of the metal or metalloid in an organic solvent and by then converting such compound to an oxide or hydrated oxide in situ by heating while simultaneously eliminating the solvent. By way of example, the initial solution may contain an acid ester such as an ester obtained by the esterification of a halide of zirconium or antimony. The resutling layer, which should be sufficiently thick to be impermeable, may be subsequently covered by a protective sheet of glass, for example, if required.

The degree to which the light-transmittance of the article is reduced by an increase in the intensity of the incident radiation depends in part upon the temperature of the light-transmitting material and, in particular, of the layer containing the halogen acceptor. It has in fact been found that by raising the temperature of such layer, the response of the light-sensitive material to increases in the intensity of incident sunlight can be reduced, or even eliminated. It is believed that this occurs because a rise in temperature prevents the halogen component from being taken up by the acceptor, with the result that any dissociation of the halide under the action of solar radiation will only attain an incipient stage. A rise in temperature of about 10° C. produces a noticeable effect and a rise in temperature of about 50° C. produces a very considerable effect.

This phenomenon is of great potential value in the construction of window glasswork since, by providing a means whereby the temperature of the layer containing the halogen acceptor can be artificially raised, the normal response of the glasswork to increases in the intensity of incident solar radiation can be wholly or partially inhibited during the cold months of the year, for example, when it is desirable to transmit all of the available sunshine. A very convenient way of heating the acceptor layer is by electrical resistance heating and, to this end, that layer may be constituted by, or include, an electrically conductive substance or substances having suitable resistivity and may be connected, at its opposite edges, to a source of electrical current, e.g., at 220 volts.

Tin oxide is a particularly suitable compound for forming such an electrically conductive halogen acceptor layer. When a current passes through the acceptor layer, the layer becomes heated to an extent depending on the strength of the current, and the current can be controlled so as to permit the glasswork to impede passage of only so much of the sunlight which would produce an uncomfortable glare. The heating of the glasswork has the further advantage of reducing the heat losses which normally occur through the windows of a room.

It has also been found to be advantageous to incorporate into some part of the light-transmitting material, for example into the halogen acceptor layer, a catalyst which promotes the dissociation and/or recombination of the halogen and metal components of the photosensitive halide.

Traces of catalyst improve the speed of response of the light-transmitting material both to increases and to decreases in the incident radiation intensity. Moreover, some catalysts, particularly copper, cadmium and nickel halides, make the halide layer-halogen acceptor layer assembly more sensitive to radiations having a wavelength higher than 500 m$\mu$, i.e., in the yellow and the red wavelengths. The use of the light-transmitting material as a "phototropic" element is therefore not limited to short wavelengths, such as the ultraviolet or certain visible radiation from the violet to the green regions. In some cases, a cobalt halide can also be used as catalyst, for instance in a layer of mercury or thallium chloride or bromide.

Several examples of specific articles having the form shown in FIG. 1 will now be described. In each of these examples, the support means 1 is constituted by a transparent glass sheet having a thickness of the order of 5 mm.

EXAMPLE 1

A support means 1 of conventional soda-lime glass is covered with a transparent layer 2 having a thickness of the order of 200 A. and composed of a mixture of 50% AgCl and 50% AgBr, by weight. The layer 2 is in turn covered with a transparent layer 3 of silicon oxide (SiO) having a thickness of the order of 5000 A. Finally, an impermeable protective layer 4 of calcium silicate is deposited to a thickness of the order of 2000 A. on the layer 3. A boundary surface 5 separates the layers 2 and 3.

The method of manufacture of this example of the embodiment of FIG. 1 is as follows: after having cleaned, rinsed with distilled water, and dried the top surface of the glass sheet 1, it is placed in a known apparatus for vaporization in vacuo, the surface to be coated facing downwards, above a crucible containing a mixture of equal parts, by weight, of AgCl and AgBr. The whole is subjected to a vacuum of the order of $10^{-5}$ mm. of mercury, while the crucible is electrically heated to about 800° C. A mixed layer 2 of silver chloride and silver bromide is then permitted to form on the glass sheet 1 until the layer 2 reaches the desired thickness, e.g., 200 A. Under a microscope, the layer is observed to have a continuous but grainy appearance, showing the existence of a micro-crystalline texture. The deposition of layer 2 and the subsequent handling of the sheet must be carried out in darkness or in the presence of a red light.

To form a layer 3 at the boundary surface 5, a similar procedure is followed, but using a crucible containing the commercial oxide SiO, which can be obtained by the volatalization of an equimolar mixture of SiO$_2$ and Si at a pressure of $10^{-4}$ mm. of mercury. The crucible containing SiO is heated to 1250° C. in a vacuum of $10^{-5}$ mm. of mercury; the deposition process takes about 8 minutes, at the end of which the layer 3 of SiO reaches the desired thickness, e.g. 5000 A. When this operation is completed it is no longer necessary to continue the treatment in darkness or in red light. Any dissociation in the silver halide layer which now takes place under the action of light is temporary and recombination will occur automatically as the radiation intensity falls.

There is then deposited in a known manner, on the transparent layer 3 of silicon oxide (SiO), a layer 4 of calcium silicate. Although the presence of the latter layer in a thickness of 2000 A. is optional, it performs the useful function of protecting the layer 3 from external mechanical and chemical influences.

As explained hereinbefore, the layer 3 of SiO stores, by adsorption at the boundary surface 5, the chlorine and bromine which are given off, probably in the gaseous state, by the microcrystalline layer 2 of silver bromide and chloride under the effect of radiation having a wavelength between 300 and 500 millimicrons and emitted, for instance, by the sun. In response to an increase in the intensity of radiation, the assembly gradually becomes more opaque, while maintaining a uniform transmission characteristic with respect to the visible spectrum, so that in full sunlight the transmission coefficient is reduced to 15% after 30 seconds' irradiation without imparting any color variation to the transmitted light. After 60 seconds in the shade, the transmission coefficient of the assembly reaches 85%.

EXAMPLE 2

On a sheet of glass 1 identical with that described in Example 1, a layer of metallic silver 50 A. in thickness is deposited by a known method, i.e., chemical reduction of the ammonia complex of silver by an aldehyde, by simultaneously spraying a solution of the complex and a solution of the reducing agent. The thickness of the deposit is controlled optically by transmitting light through the layer and monitoring its intensity variations during the coating process.

The silvered sheet is placed for 10 minutes at a temperature of 35° C. in a dark chamber containing a circulating atmosphere of chlorine gas and traces (about one part per thousand) of water vapor; whereby the layer is converted to silver chloride. The silver chloride layer 2 thus formed is then coated with a tin oxide layer 3 by atomization, still in the dark chamber, of an acetone solution of tin tetrachloride, and subsequent oxidization of this compound to a tin oxide composed of tin and oxygen in substantially stoichiometric proportions (SnO$_2$). The thickness of the tin oxide layer 3 is of the order of 1500 A.

Two opposite edges of the resulting article are edged with thin copper electrodes 6 and 7 by a technique known per se.

When the electrodes are not connected to any source of voltage, incident solar radiation reduces the transmission coefficient of the assembly to 15% after only 10 seconds irradiation. After 20 seconds in a dark room, the transmission coefficient of the assembly reaches 88% and becomes stabilized at that value.

If the electrodes are connected to a voltage source so that the temperature of the assembly is raised to 80° C. by the flow of electric current, it is noticed that under the same conditions of solar radiation as those described above the transmission coefficient does not drop below 50%. When the assembly is placed in a dark room at a temperature of 80° C., its transmission coefficient returns to 88% after only 10 seconds.

EXAMPLE 3

A glazing is made identical with that in Example 1 except that after the deposit of the layer 3 of SiO (FIG. 1), the latter is brought into contact with an oxygen atmosphere at 450° C. Nine-tenth of the SiO in the layer is oxidized by this operation to SiO$_2$. The oxidized layer 3 is then coated with the layer 4 of calcium silicate.

The transparency variations of this assembly are the same as those described in Example 1, but the rate of response is slower. Under the same radiation conditions as those employed for Example 1, the transmission coefficient becomes stabilized at 15% after 50 seconds and returns to 80% after 2 minutes. This may be explained by the fact that the chlorine and bromine are not only adsorbed at the boundary surface 5, but also migrate or diffuse into layer 3, the diffusion mechanism being substantially slower than the adsorption mechanism.

It has also been found that embodiments of the present invention can be advantageously constructed to include a gaseous layer containing the acceptor substance in a gaseous state and disposed adjacent a solid layer containing the light-responsive substance. Such arrangement can be provided, for example, in those cases where the article includes at least two light-transmitting sheets, or plates, separated from one another by an insulating air space. In such an arrangement, a solid layer containing the light-responsive substance can be disposed on the inner face of one of the plates and the acceptor substance can be provided in gaseous form and can be introduced into the space between the two plates.

Figure 2:
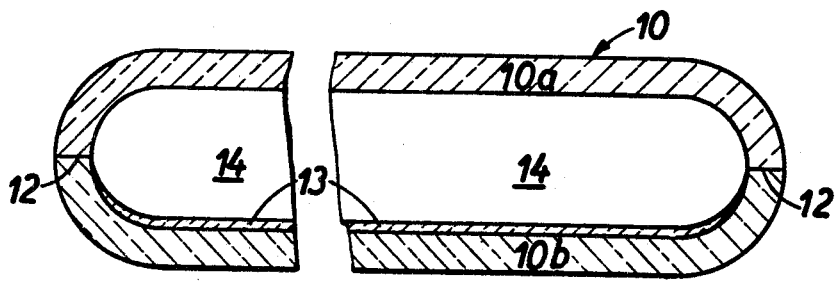
FIG. 2 is a cross-sectional view illustrating a second embodiment of the present invention.

FIG. 2 is a cross-sectional view of one embodiment of the present invention having this form of construction. This embodiment is constituted by a glasswork unit 10 composed of two light-transmitting sheets, or plates 10a and 10b connected together by fusion, for example, along their edges 12. Alternatively, the edges of the sheets 12 can be provided with a lead stripping so as to permit the sheets to be soldered together. A silver chloride layer 13, of a thickness of the order of 200 A., is deposited on the inside surface of sheet 10b, before the sheets 10a, 10b, are assembled, by the halogenation method described in connection with Example 1. The interior space 14 of the unit 10, which space is at atmospheric pressure, contains a mixture of chlorine and nitrogen, the chlorine being at a partial pressure of 10 cm. of mercury, at which pressure it is substantially colorless.

When the silver chloride layer 13 is struck by any radiation having a wavelength of between 300 and 500 m$\mu$, the layer becomes darkened in proportion to the intensity of the incident radiation, the transmission coefficient of the unit diminishing substantially equally for all wavelengths of the visible spectrum, so that the unit 10 appears to have a neutral tint when it is examined edge one. The unit 10 becomes almost completely transparent 30 seconds after the termination of the exposure to exciting radiation. No fatigue effect is noticed. The nitrogen and chlorine atmosphere in space 14 plays the role of a storage layer which reversibly retains the chlorine given off as a result of the dissociation of the silver chloride forming the layer 13.

It should be appreciated that the layers 13 and 14 of the embodiment of FIG. 2 could be given any other suitable compositions of the types described above in connection with the embodiments of FIG. 1.

Other embodiments of the present invention could also be fabricated so as to have a single layer which contains both the light-responsive substance and its associated acceptor substance. Such an embodiment is shown in FIG. 3 wherein the support means 1 is provided with a single layer 2' containing both such substances.

Figure 3:
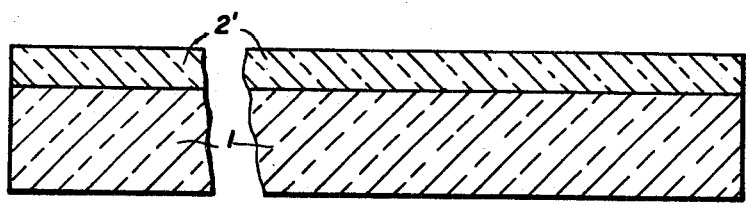
FIG. 3 is a cross-sectional view illustrating a third embodiment of the present invention.

The embodiment of FIG. 3 may be fabricated, for example, by employing a glass plate as the support means 1 and by initially subjecting the upper surface of plate 1 to a slight attack by gaseous hydrofluoric acid. The attacked surface is then cleaned and covered with a 100$\mu$ thick layer 2' which is obtained by first exposing the attacked surface of plate 1 to a vapor containing dichlorodimethyl silane and then to a vapor of mercury iodide containing 1 molecular percent of copper chloride.

It has been found that the response of such an arrangement to solar radiation is completed after two seconds of irradiation and that the original transmission coefficient of the assembly is restored after only four seconds in a dark room. Moreover, radiation having a wavelength of between 500 and 600 m$\mu$ is sufficient to cause the transmission coefficient of the arrangement to begin varying after only five seconds of irradiation.

It may thus be seen that the present invention provides novel articles, and methods for their production, which have highly advantageous, light-responsive, variable transmission coefficient characteristics and which can be based on any common, readily available support means, be it glass, plastic, Celluloid, cellophane, or the like. Moreover, embodiments according to the present invention can be fabricated so as to have either two layers, each of which contains a respective one of the light-responsive and acceptor substances, or a single layer containing both substances. Moreover, the present invention can be employed in the construction of double layer glasswork having an insulating space between two glass plates, by providing the acceptor substance in gaseous form and by disposing this substance within the insulating space.

It will be understood that the above description of the present invention is susceptible to various modifications, changes, and adaptations, and the same are intended to be comprehended within the meaning and range of equivalents of the appended claims.

What is claimed is:

1. A light-transmitting article comprising, in combination:
    (a) support means in the form of a solid sheet made of a light-transmitting material; and
    (b) a first normally transparent layer carried on one surface of said sheet and containing a first substance which reversibly dissociates under the influence of solar radiation for producing a plurality of dissociation products at least one of which acts to reduce the transparency of said layer with respect to at least a part of such radiation, and a second normally transparent layer contacting said first layer and containing a second substance for accepting at least one of the other products of such dissociation as long as the conditions causing such dissociation exist.

2. An arrangement as defined in claim 1 wherein said first layer is composed substantially entirely of said first substance.

3. An arrangement as defined in claim 1 wherein said first substance is constituted by at least one metal halide and said second substance is of a type which is capable of temporarily storing the halogen released by said halide under the influence of radiation.

4. An arrangement as defined in claim 3 wherein said metal halide is a halide of silver, mercury or thallium.

5. An arrangement as defined in claim 1 wherein said second normally transparent layer further contains a catalyst associated with said second substance for aiding at least the dissociation or recombination of said first substance under the influence of solar radiation.

6. An arrangement as defined in claim 5 wherein said catalyst is constituted by at least one halide of copper, cadmium, or nickel.

7. An arrangement as defined in claim 1 wherein said support means is made of glass.

8. An arrangement as defined in claim 1 wherein said support means is made of an acrylic plastic.

9. An arrangement as defined in claim 1 further comprising a second sheet disposed adjacent said support means for protecting said layers.

10. An arrangement as defined in claim 9 wherein said second sheet is spaced from said support means to form an enclosed space between said sheets, which space constitutes said second layer, and wherein said second substance is disposed in gaseous form in the space enclosed by said sheets.

11. An arrangement as defined in claim 10 wherein said first substance is constituted by silver chloride and said second substance is constituted by a gaseous mixture of chlorine and nitrogen.

12. An arrangement as defined in claim 1 wherein said second substance is substantially impervious to such other products of such dissociation and accepts such other products by adsorption thereof at that surface of said second normally transparent layer which is adjacent said first layer.

13. An arrangement as defined in claim 12 wherein said second substance is constituted by at least one of the oxides of silicon, titanium, aluminium, or tin.

14. An arrangement as defined in claim 12 wherein said second layer is electrically conductive, said arrangement further comprising means disposed at two opposed edges of said second layer for connection to an electric current source.

15. An arrangement as defined in claim 1 wherein said first substance is constituted by approximately 50% AgCl and 50% AgBr, by weight, and said second substance is constituted by SiO, said arrangement further comprising a third layer made of calcium silicate, covering said second normally transparent layer for protecting said second layer.

16. An arrangement as defined in claim 1 wherein said first normally transparent layer is formed by the deposition of metallic silver and its subsequent exposure to chlorine gas containing traces of water vapor, and said second normally transparent layer is of $SnO_2$, which also constitutes said second substance.

17. An arrangement as defined in claim 1 wherein said first normally transparent layer is constituted by substantially equal parts, by weight, of AgCl and AgBr, and said second normally transparent layer is composed of approximately 10% SiO and 90% $SiO_2$, by weight.

18. An arrangement as defined in claim 1 wherein said first normally transparent layer has a structure which permits, upon the occurrence of such dissociation, a substantial portion of said at least one of the other products to migrate readily to the interface of said layers so as to be readily available for reversible acceptance by said second substance.

19. A method of controlling the transmission coefficient of an article composed of a support in the form of a solid sheet made of light-transmitting material and carrying, on one of its major surfaces, a first normally transparent layer containing a first substance which reversibly dissociates under the influence of solar radiation for producing a plurality of dissociation products at least one of which reduces the transparency of the layer with respect to at least a part of such radiation, and a second normally transparent layer disposed on said first layer and containing a second substance for accepting at least one of the other products of such dissociation as long as the conditions causing such dissociation exist, comprising the step of varying the temperature of such article.

20. A method as defined in claim 19 wherein said step of varying the temperature of such article is carried out by imparting a substantial electrical resistivity to one said layer, passing an electric current through such layer, and controlling the value of such current.

21. A light-transmitting article comprising, in combination: support means made of a light-transmitting material; and a normally transparent layer carried by said support means and containing a first substance constituted by mercury iodide containing one molecular percent of copper chloride which reversibly dissociates under the influence of solar radiation for producing a plurality of dissociation products at least one of which acts to reduce the transparency of said layer with respect to at least a part of such radiation, and a second substance constituted by dichlorodimethyl silane for accepting at least one of the other products of such dissociation as long as the conditions causing such dissociation exist.

References Cited

UNITED STATES PATENTS 2,710,274   6/1955   Kuehl _____ 154—2.77
3,252,374   5/1966   Stookey _____ 88—61

FOREIGN PATENTS 950,906   2/1964   Great Britain.
1,008,536   10/1965   Great Britain.

RONALD L. WIBERT, Primary Examiner
P. K. GOODWIN, Jr., Assistant Examiner